United States Patent
Loos et al.

(10) Patent No.: US 9,920,802 B2
(45) Date of Patent: Mar. 20, 2018

(54) BRAKE PAD FOR FASTENING ON A BRAKE CALIPER OF A VEHICLE BRAKING DEVICE

(71) Applicant: Dr. Ing. h.c. F. Porsche Aktiengesellschaft, Stuttgart (DE)

(72) Inventors: Adrian Loos, Taunusstein (DE); Daniel Wallner, Leonberg (DE); Uwe Dausend, Weissach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 15/062,741

(22) Filed: Mar. 7, 2016

(65) Prior Publication Data
US 2016/0273599 A1   Sep. 22, 2016

(30) Foreign Application Priority Data
Mar. 19, 2015 (DE) .......... 10 2015 104 156

(51) Int. Cl.
*F16D 69/00* (2006.01)
*F16D 65/095* (2006.01)

(52) U.S. Cl.
CPC ................. *F16D 65/095* (2013.01)

(58) Field of Classification Search
CPC ..... F16D 65/092; F16D 65/095; F16D 55/227
USPC ........ 188/73.44, 73.45, 250 B, 250 E, 250 G
See application file for complete search history.

(56) References Cited

U.S. PATENT DOCUMENTS

| | | | |
|---|---|---|---|
| 3,616,878 A | 11/1971 | Girauldon | |
| 4,119,180 A | 10/1978 | Horie | |
| 5,236,068 A * | 8/1993 | Nagai | F16D 65/092 188/250 E |
| 8,556,046 B2 * | 10/2013 | Ciotti | F16D 65/095 188/250 B |
| 2012/0043168 A1 * | 2/2012 | Narayanan V | F16D 55/227 188/72.1 |
| 2015/0041259 A1 | 2/2015 | Ishizuka | |

FOREIGN PATENT DOCUMENTS

| | | |
|---|---|---|
| DE | 2738582 | 3/1978 |
| EP | 2746612 | 6/2014 |
| JP | 48-9513 | 3/1973 |
| JP | 08303498 | 11/1996 |

OTHER PUBLICATIONS

German Search Report for German Application No. 10 2015 104 156.1 dated Oct. 28, 2015, including partial translation T2.

* cited by examiner

*Primary Examiner* — Christopher P Schwartz
(74) *Attorney, Agent, or Firm* — RatnerPrestia

(57) ABSTRACT

A brake pad (10) for fastening on a brake caliper (110) of a vehicle braking device (100), having a main body (20) and a brake lining (22) arranged over an extended area on the main body (20), wherein the main body (20) has at least two guide openings (24) to receive in each case one guide pin (112), wherein each of the guide openings (24) has a guiding portion (25), wherein the guiding portions (25) of all the guide openings (24) have a radius of guidance (FR) with a common center of guidance (FM).

14 Claims, 2 Drawing Sheets

# BRAKE PAD FOR FASTENING ON A BRAKE CALIPER OF A VEHICLE BRAKING DEVICE

CROSS-REFERENCE TO RELATED APPLICATIONS

This application claims priority under 35 U.S.C. § 119 to German Patent Application No. 10 2015 104 156.1, filed Mar. 19, 2015, which is incorporated by reference herein in its entirety.

FIELD OF THE INVENTION

The present invention relates to a brake pad for fastening on a brake caliper of a vehicle braking device, and to a vehicle braking device having a brake caliper of this kind and a brake disk and a brake pad.

BACKGROUND OF THE INVENTION

It is known that brake calipers in which brake pads are movably mounted are used in vehicle braking devices. These brake pads are used for bringing into frictional contact with a brake disk in order to be able to bring about vehicle deceleration. For this purpose, it is necessary that the brake pads are provided with a suitable guide, which guides a feed movement, i.e. a braking movement. Corresponding main bodies are provided for this purpose in the case of known brake pads, in which main bodies guide openings are formed, through which guide pins project. In the case of use of a braking device, the brake lining comes into braking contact with the surface of a brake disk. This gives rise to a force acting on the guide pins and on the rim of the guide openings, on the one hand enabling an accompanying movement by the brake pad together with the brake disk to take place relative to the brake caliper within very narrow limits. This accompanying movement is guided by the guide openings.

SUMMARY OF THE INVENTION

The disadvantage with the known solutions is that a relative movement in the radial direction in relation to the brake disk is also made possible for the brake pads by the possible relative movement in the direction of rotation of the brake disk. This can furthermore lead to the brake pads jumping across a radial offset in relation to the brake disk within narrow limits.

It is therefore an object of the present invention to at least partially eliminate the disadvantages described above. In particular, it is an object of the present invention to be able to make available better braking performance and/or a better brake feel in an economical and simple manner.

Described herein is a brake pad for fastening on a brake caliper of a vehicle braking device, having a main body and a brake lining arranged over an extended area on the main body, wherein the main body has at least two guide openings to receive in each case one guide pin, characterized in that each of the guide openings has a guiding portion, wherein the guiding portions of all the guide openings have a radius of guidance (FR) with a common center of guidance (FM) and by a vehicle braking device having a brake caliper, a brake disk and at least one brake pad, wherein the brake caliper has at least two guide pins, which are passed through the at least two guide openings in the at least one brake pad. Further features and details of the invention will become apparent from the dependent claims, the description and the drawings. Here, features and details which are described in connection with the brake pad according to the invention also apply, of course, in connection with the vehicle braking device according to the invention and vice versa in each case, and therefore reciprocal reference is or can always be made as regards the disclosure of the individual aspects of the invention.

A brake pad according to aspects of the invention is designed for fastening on a brake caliper of a vehicle braking device. The brake pad has a main body and a brake lining arranged over an extended area on the main body. In this case, the main body furthermore has two guide openings to receive in each case one guide pin. A brake pad according to the invention is characterized in that each of the guide openings has a guiding portion. These guiding portions of all the guide openings have a radius of guidance with a common center of guidance.

According to aspects of the invention, therefore, it is especially the guide openings which have been developed further. These guide openings are each provided with a guiding portion, wherein a guiding portion should be taken to mean, in particular, that portion of the guide opening which comes into guiding contact with the respective guide pin in a braking situation during the use of the brake pad. This means that the relative movement described between the brake pad and the brake caliper results in a relative movement between the guide opening of the brake pad and the guide pin of the brake caliper. This relative movement described takes place in a guided manner, namely in the form of the edge of the guide pin sliding along the respective guiding portion of the respective guide opening.

The above relative movement and the corresponding guidance now relate to a defined guide path. Although the individual guiding portions are situated in different, mutually spaced guide openings, the guiding portions form a common and therefore unitary guide path. All the guiding portions lie on a common radius of guidance having a common center of guidance. This has the effect that, during the relative movement described, said movement of the brake pad takes place on this common guide path. In other words, this relative movement follows the same radius of curvature, which is determined by the radius of guidance and the common center of guidance. Particularly in respect of the illustrative embodiments of the invention which are explained below, it is possible in this way to specify a curved path of movement for the brake pad for the described movement relative to the brake caliper.

The curved path of brake pad movement explained above has the effect that, in the case of a brake disk which has already been in use for a prolonged period and accordingly may have grooves or other defects, there may be an accompanying movement along these grooves, which are likewise formed concentrically. In contrast to the known solutions for brake pad fastenings, there is therefore no radial movement or only a slight radial movement as regards a relationship with the brake disk. On the contrary, the relative movement between the brake pad and the brake caliper takes place in a curved manner, wherein this curvature can be adapted to the curvature and hence the radius of the brake disk. In other words, in the case of use of the brake, the brake pad is taken along by the brake disk by a very small amount and the guide follows or determines the curvature of the guidance during this process, allowing the relative movement of the brake pad to follow the relative movement of the brake disk in relation to the fixed brake caliper.

The above correlation of the movements has the effect that it is no longer possible for a radial movement of the brake pad relative to the brake disk to be performed. This avoids a situation where, in the case of braking, the brake pad can jump backward and forward in a radial direction between different notches or grooves on the brake disk. This, in turn, leads to a significantly improved brake feel and, in particular, also to an even better braking performance. The extended-area contact between the brake pad and the brake disk is thereby particularly preferably increased even further.

It can be advantageous if, in the case of a brake pad according to the invention, the radius of guidance is smaller than the outside radius of a brake disk of the vehicle braking device and larger than the inside radius of the brake disk of the vehicle braking device. This means that the guide openings are also arranged between the outside radius and the inside radius of the brake disk. This makes it possible, depending on the braking situation, to better dissipate the forces which develop in respect of the braking process between the brake disk and the brake pad, owing to friction. In particular, clean radial and axial support of the braking forces which arise is achieved. It is preferred if the radius of guidance is situated substantially centrally between the outside radius and the inside radius ±10% of the distance between the outside radius and the inside radius of the brake disk. This has the effect that possible tilting moments which arise can be supported evenly between the outside radius and the inside radius of the brake disk.

It is furthermore advantageous if, in the case of a brake pad according to the invention, the center of guidance is arranged in the disk center of a brake disk of the vehicle braking device. By its geometrical dimensions and especially through the alignment and arrangement of the brake lining, the brake pad itself is usually matched to a defined brake disk size. At the same time, the correlation with the brake caliper in respect of the geometrical arrangement is also predetermined. Thus, the design of the brake pad and of the arrangement of the guide openings allows a clear correlation, thus enabling the disk center to be arranged concentrically with the center of guidance. At the same time, this concentric arrangement can, of course, allow an axial offset between these two centers. The concentric design has the effect that a radial movement relative to the brake disk during the movement of the brake pad with the brake disk is essentially completely avoided. In this way, the advantages described in respect of the present invention can be achieved in a better way.

It is likewise advantageous if, in the case of a brake pad according to the invention, the guide openings have an opening axis which is aligned perpendicularly or substantially perpendicularly to the surface of the brake lining. This means that the main body is designed, in particular, as an extended surface and/or in a plate shape. The same applies to the brake lining, which is likewise designed, in particular, as an extended surface and/or in a plate shape. The perpendicular extent of the opening axes has the effect that the opening axes of all the guide openings are preferably parallel relative to one another. Arranging the opening axes perpendicular to the surface of the brake lining furthermore entails the possibility of making the brake pad particularly flat and hence entails a reduction in the overall dimensions and weight of the vehicle braking device as a whole.

It can be another advantage if, in the case of a brake pad according to the invention, the guiding portions of all the guide openings have an identical or substantially identical angular extent. In the sense according to the present invention, an angular extent should be taken to mean an extent along the defined radius of curvature. Thus, a circle of guidance, on which circular segments or circular line segments of this circle of guidance can be correspondingly occupied by the respective guiding portion, can be defined by the center of guidance and the radius of guidance. The start and the end of each guiding portion thus generate two radii which enclose this corresponding angular extent. According to this embodiment, therefore, the angular extents of the guiding portions are of equal length, thus allowing all the guiding portions to make available the quality of guidance as a guide path over the same length.

It is furthermore advantageous if, in the case of a brake pad according to the invention, the guiding portions of all the guide openings have an angular extent in a range of between about 1° and about 5°. In particularly large arrangements, ranges from about 0.5° up to about 10° are, of course, also conceivable. This has the effect that the guide opening is preferably an, as it were, curved elongate hole. The shorter the design of the guiding portions, the smaller also the guide openings which can be made available. In this way, in particular, the relative mobility of the brake caliper and the brake pad is also minimized further.

It is furthermore advantageous if, in the case of a brake pad according to the invention, the guiding portions of all the guide openings are arranged on the radially outward-oriented rim of the guide openings. Here, the guide openings are provided with a rim which surrounds the actual aperture of the opening. Here, the radially outward-oriented rim is the part of said rim which is further away from the center of guidance of the guiding portions. In contrast, the inward-oriented rim is, according to the following paragraph, the rim of the guide opening which is arranged closer to the center of guidance. Arranging the guiding portions on the radially outward-oriented rim of the guide openings has the effect that the larger radius of guidance also makes available the corresponding guidance function there. This leads to larger lever arms and hence to improved support effects in respect of the transmission of force between the brake lining, the brake disk and the brake caliper.

It is likewise advantageous if, in the case of a brake pad according to the invention, additional secondary guiding portions are arranged on the radially inward-oriented rim of the guide openings, having a secondary radius of guidance with a common secondary center of guidance, which is identical or substantially identical with the center of guidance. This, as it were, makes it possible to provide dual guidance, wherein the distance between the guiding portions and the secondary guiding portions is preferably greater than the corresponding extent of the guide pins. This leads, as it were, to curved parallelism or a parallel guidance functionality of these guiding portions and of the secondary guiding portions.

A vehicle braking device having a brake caliper, a brake disk and at least one brake pad according to the present invention is likewise the subject matter of the present invention.

Here, the brake caliper has at least two guide pins, which are guided by the at least two guide openings in the at least one brake pad. Through the use of a brake pad according to the invention, a vehicle braking device according to the invention provides the same advantages as those which have been explained in detail with reference to a brake pad according to the invention. In this case, the guide pins are preferably designed as round or substantially round guide pins. However, curved guide pins can also be provided. As regards their arrangement, the guide pins here likewise lie on a common pin radius, preferably with a common pin center. This pin center is preferably identical or substantially identical with the center of guidance already described. This makes it possible to feed in the brake pad in the axial direction of the guide pins and thus activate the braking effect. At the same time, the movement function explained several times, which can accordingly be carried out in a guided manner with concentric curvature as regards its relationship to the brake disk, can be performed along the guiding portions relatively between the brake pins and the any guide openings.

BRIEF DESCRIPTION OF THE DRAWINGS

Further advantages, features and details of the invention will become apparent from the following description, in which illustrative embodiments of the invention are described in detail with reference to the drawings. Here, the features mentioned in the claims and the description may each be essential to the invention individually or in any desired combination. In the drawings, which are schematic:

DETAILED DESCRIPTION OF THE INVENTION

Figure 1:
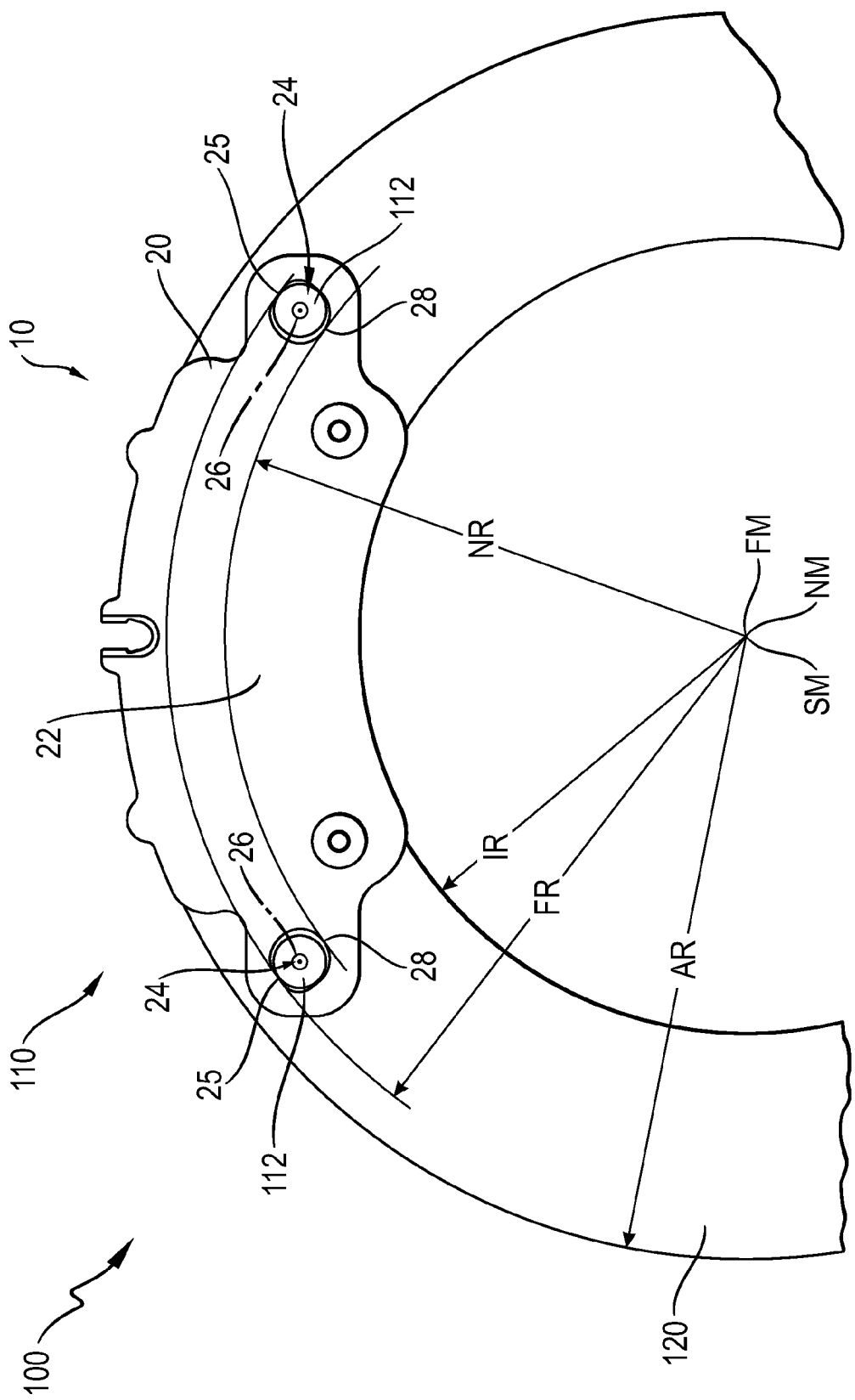
FIG. 1 shows an embodiment of a brake pad according to the invention for a vehicle braking device according to the invention.

FIG. 1 shows a vehicle braking device 100 according to the invention having a brake caliper 110 (not shown specifically). Here, the brake caliper 110 has two guide pins 112, which extend upward in an axial direction out of the plane of the drawing in FIG. 1. A brake pad 10 according to the present invention is placed on these two guide pins 112. This brake pad 10 is formed with a main body 20 extending in a plate shape, on the two ends of which, on the left and on the right, a guide opening 24 is in each case provided. A brake lining 22 (likewise not shown specifically) is arranged between the guide openings 24.

In order to make available the braking effect in a known manner, the brake lining 22 can come into braking contact with the brake disk 120 through an axial feed motion perpendicular to the plane of the drawing in the figure. Here, this brake disk 120 is of annular design, having an outside radius AR and an inside radius IR.

The two guide openings 24 are now both provided in a manner according to the invention with guiding portions 25. Here, these two guiding portions 25 are surfaces on the inner wall of the apertures of the guide openings 24. In this case, these guiding portions 25 extend over a curved guide path, having a radius of guidance FR about a common center of guidance FM. As is clearly apparent here, a movement of the brake pad 10 relative to the brake caliper 110 leads to a movement along this curved guide path. Moreover, there is a concentric arrangement of the center of guidance FM relative to the disk center SM. This has the effect that, when the braking function is activated, a small movement of the brake pad 10 with the brake disk 120 initially takes place. This is the relative movement, described several times, between the brake pad 10 and the brake caliper 110. This relative movement is guided by sliding of the guide pins 112 on the guiding portions 25 formed, and this is therefore likewise a concentric movement along the radius of guidance FR about the center of guidance FM.

For the above-described case, the entire brake lining 22 of the brake pad 10 can thus follow corresponding depressions, grooves or notches in the circumferential direction or in a concentric formation in the brake disk 120, thereby making it possible to achieve the improved brake feel and/or the improved braking performance.

Figure 2:
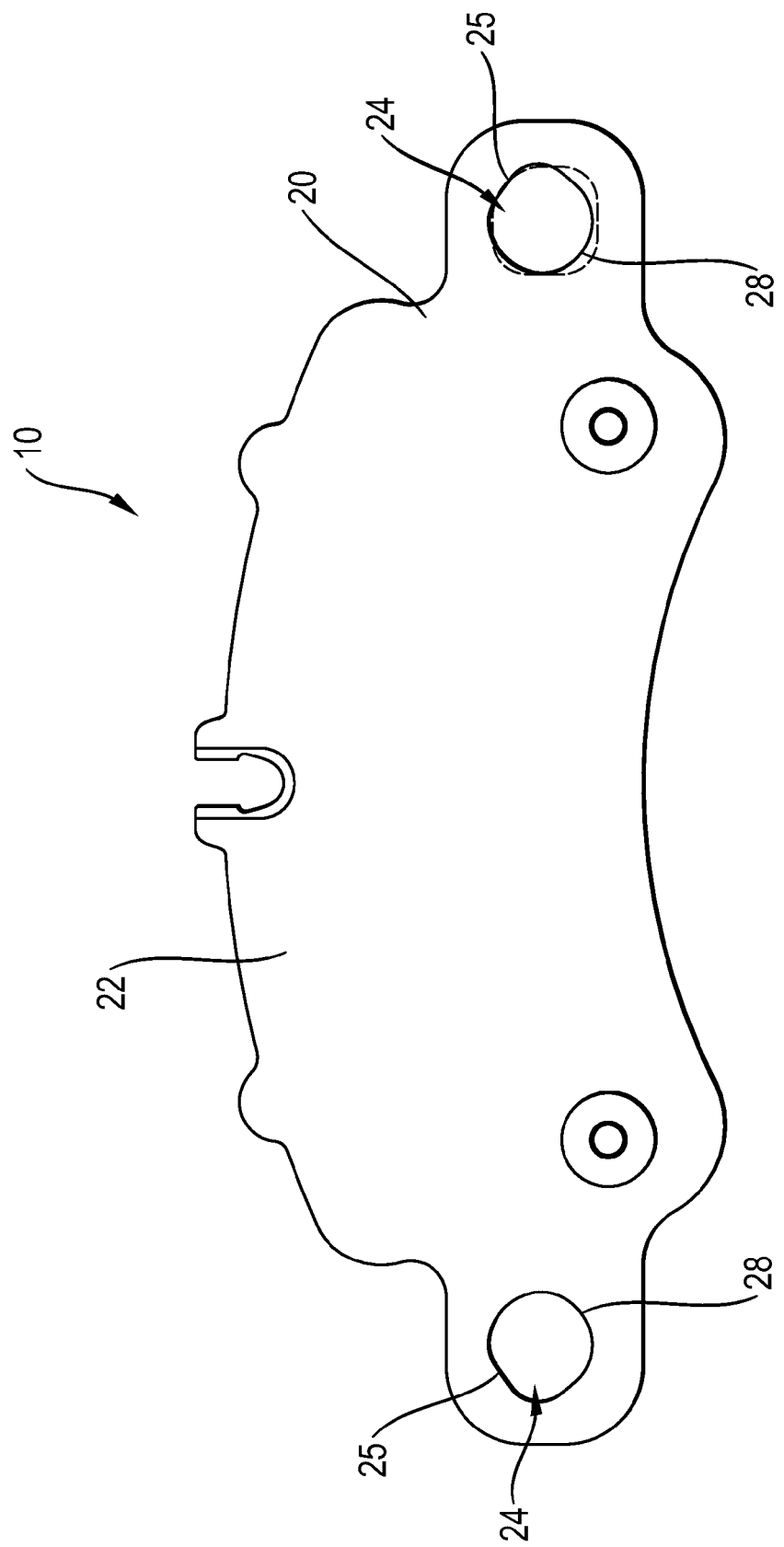
FIG. 2 shows a detail of one embodiment of a brake pad according to aspects of the invention.

It can furthermore be seen in FIG. 1, as also in FIG. 2, that secondary guiding portions 28 can be provided in addition, these guiding portions being arranged on the inner rim of the guide openings 24 as regards orientation. Thus, the secondary radius of guidance NR is also smaller than the radius of guidance FR. However, the secondary center of guidance NM coincides in an identical manner and formed concentrically with the center of guidance FM and the disk center SM. It is thus possible as it were to make available guidance in a manner curved in parallel.

The above explanation of the embodiments describes the present invention exclusively in the context of examples. Of course, individual features of the embodiments can be combined freely with one another, insofar as this is technically worthwhile, without exceeding the scope of the present invention.

The invention claimed is:

1. A brake pad for fastening on a brake caliper of a vehicle braking device having a brake disk with an outside radius (AR), an inside radius (IR), and a disk center (SM), said brake pad having a main body and a brake lining arranged over an extended area on the main body, wherein the main body has at least two guide openings to receive in each case one guide pin, wherein each of the guide openings has an inner wall forming a surface comprising a guiding portion that comes into contact during braking with the respective guide pin received in the guide opening, each guiding portion comprising an arc of a circle defined by a radius of guidance (FR) with a common center of guidance (FM), wherein the center of guidance (FM) is identical or substantially identical with the disk center (SM) of the brake disk of the vehicle braking device, the guiding portions together forming a common guide path coinciding with the circle defined by the radius of guidance (FM).

2. The brake pad as claimed in claim 1, wherein the guiding portions of all the guide openings are arranged on the radially outward-oriented inner wall of the guide openings.

3. The brake pad as claimed in claim 2, wherein additional secondary guiding portions are arranged on the radially inward-oriented inner wall of the guide openings, having a secondary radius of guidance (NR) with a common secondary center of guidance (NM), which is identical or substantially identical with the center of guidance (FM).

4. A vehicle braking device having a brake caliper, a brake disk and at least one brake pad according to claim 3, wherein the brake caliper has at least two guide pins, which are passed through the at least two guide openings in the at least one brake pad.

5. A vehicle braking device having a brake caliper, a brake disk and at least one brake pad according to claim 2, wherein the brake caliper has at least two guide pins, which are passed through the at least two guide openings in the at least one brake pad.

6. The brake pad as claimed in claim 1, wherein the guiding portions of all the guide openings have an identical or substantially identical angular extent.

7. A vehicle braking device having a brake caliper, a brake disk and at least one brake pad according to claim 6, wherein the brake caliper has at least two guide pins, which are passed through the at least two guide openings in the at least one brake pad.

8. The brake pad as claimed in claim 1, wherein the guiding portions of all the guide openings have an angular extent in a range of between 1° and 5°.

9. A vehicle braking device having a brake caliper, a brake disk and at least one brake pad according to claim 8, wherein the brake caliper has at least two guide pins, which are passed through the at least two guide openings in the at least one brake pad.

10. The brake pad as claimed in claim 1, wherein the radius of guidance (FR) is smaller than the outside radius (AR) of the brake disk of the vehicle braking device and larger than the inside radius (IR) of the brake disk of the vehicle braking device.

11. A vehicle braking device having a brake caliper, a brake disk and at least one brake pad according to claim 10, wherein the brake caliper has at least two guide pins, which are passed through the at least two guide openings in the at least one brake pad.

12. The brake pad as claimed in claim 1, wherein the guide openings have an opening axis which is aligned perpendicularly or substantially perpendicularly to the surface of the brake lining.

13. A vehicle braking device having a brake caliper, a brake disk and at least one brake pad according to claim 12, wherein the brake caliper has at least two guide pins, which are passed through the at least two guide openings in the at least one brake pad.

14. A vehicle braking device having a brake caliper, a brake disk and at least one brake pad according to claim 1, wherein the brake caliper has at least two guide pins, which are passed through the at least two guide openings in the at least one brake pad.

* * * * *